United States Patent [19]

Mizuhara et al.

[11] Patent Number: 4,985,887

[45] Date of Patent: Jan. 15, 1991

[54] SYSTEMS FOR SELECTING A TRANSMISSION CONTROL PROCEDURE IN COMMUNICATIONS USING INTEGRATED SERVICES DIGITAL NETWORKS

[75] Inventors: Noboru Mizuhara, Kawasaki; Kansuke Kuroyanagi, Yokohama, both of Japan

[73] Assignee: Thomson Composants Microondes, Puteaux, France

[21] Appl. No.: 448,922

[22] Filed: Dec. 12, 1989

[30] Foreign Application Priority Data

Dec. 14, 1988 [JP] Japan .................... 63-315662

[51] Int. Cl.$^5$ ............................. H04J 3/14
[52] U.S. Cl. ...................................... 370/58.2; 370/60
[58] Field of Search ............... 370/58.2, 60, 79, 110.1; 340/825.06, 825.07

[56] References Cited

U.S. PATENT DOCUMENTS 4,700,340 10/1987 Beranek et al. ................ 370/60
4,736,364 4/1988 Basso et al. .................... 370/110.1
4,908,824 3/1990 Leibe et al. .................... 370/85.15
4,922,486 5/1990 Lidinsky et al. ............... 370/60

FOREIGN PATENT DOCUMENTS 56-94861 7/1981 Japan .
60-162334 8/1985 Japan .
62-2749 1/1987 Japan .

Primary Examiner—Douglas W. Olms
Assistant Examiner—Melvin Marcelo
Attorney, Agent, or Firm—Oblon, Spivak, McClelland, Maier & Neustadt

[57] ABSTRACT

A transmission procedure selecting system in a data communication network system which includes a plurality of terminals, an ISDN switching network which exchanges a plurality of circuit lines with the plurality of terminals, a communication control device connected with the ISDN switching network via a multiplexed interface for providing transmission control for data transmitted through the interface, the communication control device including a plurality of transmission control circuits connected with respective data channels in the multiplexed interface, and a central processing unit connected to the communication control device. The process comprises a step that prior to transmission of data from a terminal to the central processing unit, said terminal transmits a call setup signal which designates the transmission control procedure adaptive to said terminal via a control channel of the multiplexed interface; a step that the central processing unit selects a transmission control circuit designated by the transmission control procedure in the call setup signal received via the control channel; and a step that the central processing unit transmits to the ISDN switching network via the control channel of the multiplexed interface a request for connection of the terminal and the data channel connected to the selected transmission control circuit.

8 Claims, 14 Drawing Sheets

FIG. 14

| PROTOCOL IDENTIFICATION/SUB-ADDRESS | UNOCCP. PRESENCE /ABSENCE | NUMBER OF TRANSMIS- SION CIRCUITS | OCCP./ UNOCCP. | ---- |
|---|---|---|---|---|
| -------- | | | | |

31 — 101 — 102 — 103 — 100

SYSTEMS FOR SELECTING A TRANSMISSION CONTROL PROCEDURE IN COMMUNICATIONS USING INTEGRATED SERVICES DIGITAL NETWORKS

BACKGROUND OF THE INVENTION

The present invention relates to systems for selecting a transmission control procedure or protocol suitable for communication of data via an integrated services digital network (ISDN) between a computer and a plurality of terminals.

In order to ensure transmission of data to a target terminal, it is necessary to confirm the connection of a line, the target terminal and the correct reception of data. A series of these procedures is referred to as transmission control, which can be said to be a rule in data transmission. The transmission control includes line control directed to the connection of a communication line to a target terminal, control for the synchronization of a digital signal, error control for error detection and execution of the transmission control procedure. The transmission control procedure includes setting of a logical data link for a communication program on the line between the transmission end and the reception end and transmitting data in accordance with a predetermined operational procedure. Usually, the transmission control procedure varies depending on the kind of a terminal to which the data is transmitted. The kind of transmission control procedures are, for example, standardized in accordance with CCITT Recommendations.

Conventionally, various transmission control procedures are used between a computer (center) and terminals. Generally, one terminal installs one kind of transmission control procedure while the computer (center) uses a communication control device which includes transmission control circuits to perform a plurality of kinds of transmission control procedures to communicate with various terminals.

When a terminal calls and communicates with the computer via a switching network, it is required to cause the transmission control procedure used by the terminal to coincide with that used by the computer. To this end, a plurality of circuit lines are conventionally connected to the communication control devices of the computer and fixedly allocated corresponding specific transmission control procedures. Namely, the lines and the transmission control procedures are put in one-to-one corresponding relationship. When a terminal sends a signal on a line, the operator dials a telephone number of the line to which the same transmission control procedures as that used by the terminal is allocated to thereby connect the terminal and the line having the same transmission control procedure.

The conventional communication control devices of the above computer are disclosed, for example, in Japanese Patent Publication JP-A-56-94861 filed by FUJITSU Limited, Dec. 28, 1979 in Japan; Japanese Patent Publication JP-A-62-2749 filed by NEC Corporation, Jun. 28, 1985 in Japan: and Japanese Patent Publication JP-A-60-162334 filed by HITACHI Limited, Feb. 3, 1984 in Japan.

These conventional systems are each effective for selecting a specific transmission control procedure using a telephone number in a communication system which uses an analog switching network such as that shown in FIG. 1 or for a communication control apparatus having a single channel, but cannot be applied to an ISDN which will be the main flow of the network infrastructure in the future.

According to the ISDN, a plurality of different terminal devices, for example, telephones, facsimile terminals, video signal devices, and personal computers can communicate signals collectively on a single digital line. The ISDN lines include a plurality of B channels of a 64 kb/s rate and a D channel of 16 or 64 kb/s. The B channel is a data channel to transmit communication data therethrough from a terminal while the D channel is a control channel to transmit a signal for transmission control therethrough.

As shown in FIG. 2, a plurality of communication channels are multiplexed in a single interface 6 (two channels are multiplexed in the basic interface in the B channel and 23 or 24 channels in the primary-rate group interface) in the ISDN and communication is possible with different terminals using the respective channels. Since only one telephone number is given to a single interface, it is impossible to designate, using a telephone number, the line of the communication control device to which the same transmission control means as that which the terminal affords is assigned.

SUMMARY OF THE INVENTION

It is an object of the present invention to provide a transmission control procedure or protocol selecting system which is capable of communication with a terminal using a transmission control procedure suitable for the terminal in response to a call from the terminal when the computer communications with the terminal via an ISDN.

According to the present invention, there is provided a transmission procedure selecting process in a data communication network system which includes a plurality of terminals, an ISDN switching network which exchanges a plurality of circuit lines with the plurality of terminals, a communication control device connected with the ISDN switching network via a multiplexed interface for providing transmission control for data transmitted through the interface, the communication control device including a plurality of transmission control circuits connected with respective data channels in the multiplexed interface, and a central processing unit connected to the communication control device, comprising:

a step that prior to transmission of data from a terminal to the central processing unit,.said terminal transmits a call setup signal which designates the transmission control procedure adaptive to said terminal via a control channel of the multiplexed interface;

a step that the central processing unit selects a transmission control circuit designated by the transmission control procedure in said call setup signal received via the control channel; and a step that the central processing unit transmits to the ISDN switching network via the control channel of the multiplexed interface a request for connection of the terminal and the data channel connected to the selected transmission control circuit.

In the present invention, a table is used where protocol discrimination or destination subaddress information contained in a low layer compatibility information in a call setup request signal delivered by a terminal via the ISDN corresponds to a B channel number in the ISDN interface between the communication control device and the ISDN to select an appropriate one from a plurality of different transmission control procedures. The originating terminal and the communication control device use the same transmission control procedure to thereby allow data communication between the terminal and the central processing unit of the communication control device. If a connection switching circuit is additionally used, communication is performed by switching a line where traffic using a specific transmission control procedure occurs collectively to another one.

BRIEF DESCRIPTION OF THE DRAWINGS

FIG. 14 illustrates the structure of a transmission control circuit management table used when the transmission control procedures are smaller in number than the B channels in the ISDN interface of FIG. 9;

DESCRIPTION OF THE PREFERRED EMBODIMENTS

The embodiments of the present invention will now be described in detail with reference to the drawings.

I. First Embodiment

Figure 1:
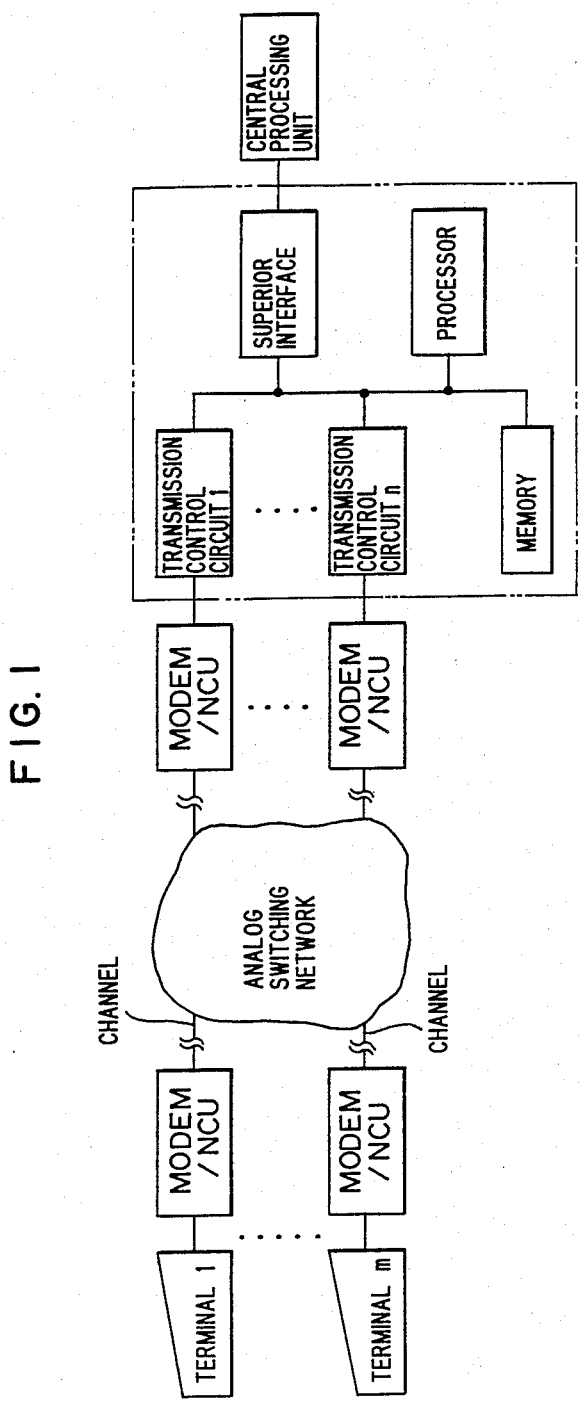
FIG. 1 is a schematic of a communication system using a conventional analog communication switching network.
Figure 2:
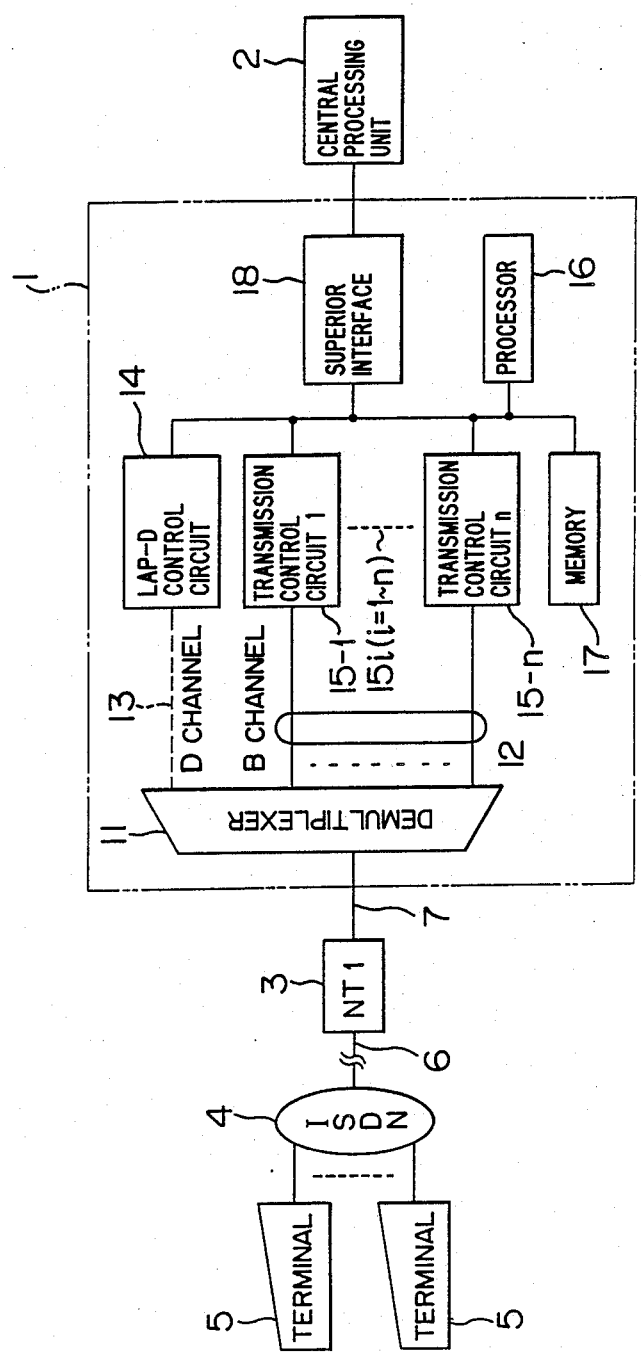
FIG. 2 shows the illustrative structure of a communication network used for describing a transmission control procedure selecting system indicative of a first embodiment of the present invention.

FIG. 2 is a schematic of a communication network used for describing a transmission control procedure selecting system indicative of the first embodiment of the present invention.

In FIG. 2, reference numeral 1 denotes a communication control device to provide ISDN circuit line control; 2, a central processing unit which comprises a host computer connected to the communication control device 1; 3, a network terminal (NT) which terminates and converts a U-interface circuit line 6 of ISDN 4 to an S/T interface 7 of the ISDN 4; 5, terminals connected to the ISDN 4; 11, a demultiplexer which demultiplexes B-channels (of 64 kb/s) 12 and a control D channel (of 16 or 64 kb/s) 13 multiplexed in the S/T interface 7; 14, a LAPD (Link Access Procedure on the D channel) control circuit which performs the layer 2 transmission control procedure of the D channel 13; 15-i, a transmission control circuit ($1 \leq i \leq n$) which executes the communication control procedure for a communication between a terminal 5 using the B channel and the central processing unit 2; 16, a processor which performs D channel layer 2 call processing and buffers communication data between a terminal 5 and the central processing unit 2 using a transmission control circuit 15-i; 17, a memory which stores tables and buffers of communication data produced between a terminal 5 and the central processing unit 2 for realizing the inventive transmission control procedure selecting system; and 18, a superior interface which transfers communication data and control data between the communication control device 1 and the central processing unit 2. In the ISDN 4, a plurality of communication channels are multiplexed in a single interface (circuit line) (two channels are multiplexed in the basic-rate interface in the B channel and 23 or 24 channels are multiplexed in the primary-rate interface). The number of transmission control circuits 15-i is determined optionally in accordance with the number of B channels in the ISDN interface and the kinds of transmission control procedures.

In the first embodiment of the present invention, a plurality of communication control circuits 15-i are provided which execute different transmission control procedures and which are equal in number to the B channels in the ISDN interface, in the communication control device 1 of the communication network system of FIG. 2. The respective B channels in the ISDN interface are connected to the corresponding communication control circuits 15-i. In response to the terminating code from the terminal 5, the processor 16 in the communication control device 1 selects a communication control circuit 15-i which executes a transmission control procedure indicated by terminal communication attribute information (protocol identification contained in low layer compatibility information or the destination subaddress information) in a call setup signal received via the D channel in accordance with the terminal communication attribute information and transmits to the ISDN 4 a request for communication with the terminal 5 using the B channel connected to the transmission control circuit 15-i.

Figure 3:
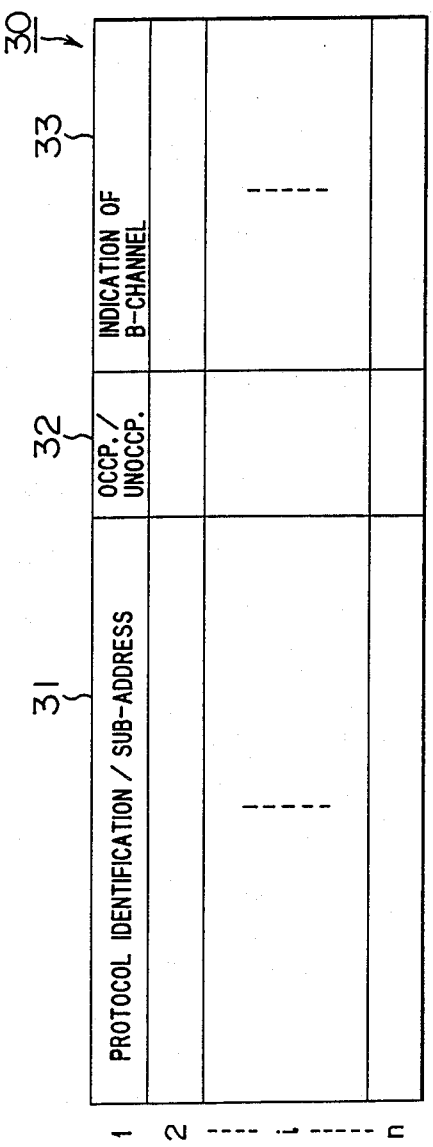
FIG. 3 shows the illustrative structure of a table in which a protocol discrimination/subaddress corresponds to a B channel.

FIG. 3 is a schematic of a table 30 in which a protocol identification/subaddress corresponds to a B channel. The table 30 is stored in the memory 17 and includes a plurality of records each comprising a protocol identification/subaddress indication 31, an occupied/unoccupied transmission control circuit indication 32 and a B channel indication 33. A transmission control procedure executed by the corresponding transmission control circuit 15-i is designated in each of the record areas 31 of the table 30. Each transmission control circuit 15-i is numbered corresponding to a relative position from the head record of the table. Each record area 32 indicates the occupied/unoccupied state of the transmission control circuit designated by the corresponding area 31. Each record area 33 indicates a B channel connected to the transmission control circuit designated by the corresponding area 31.

Figure 4:
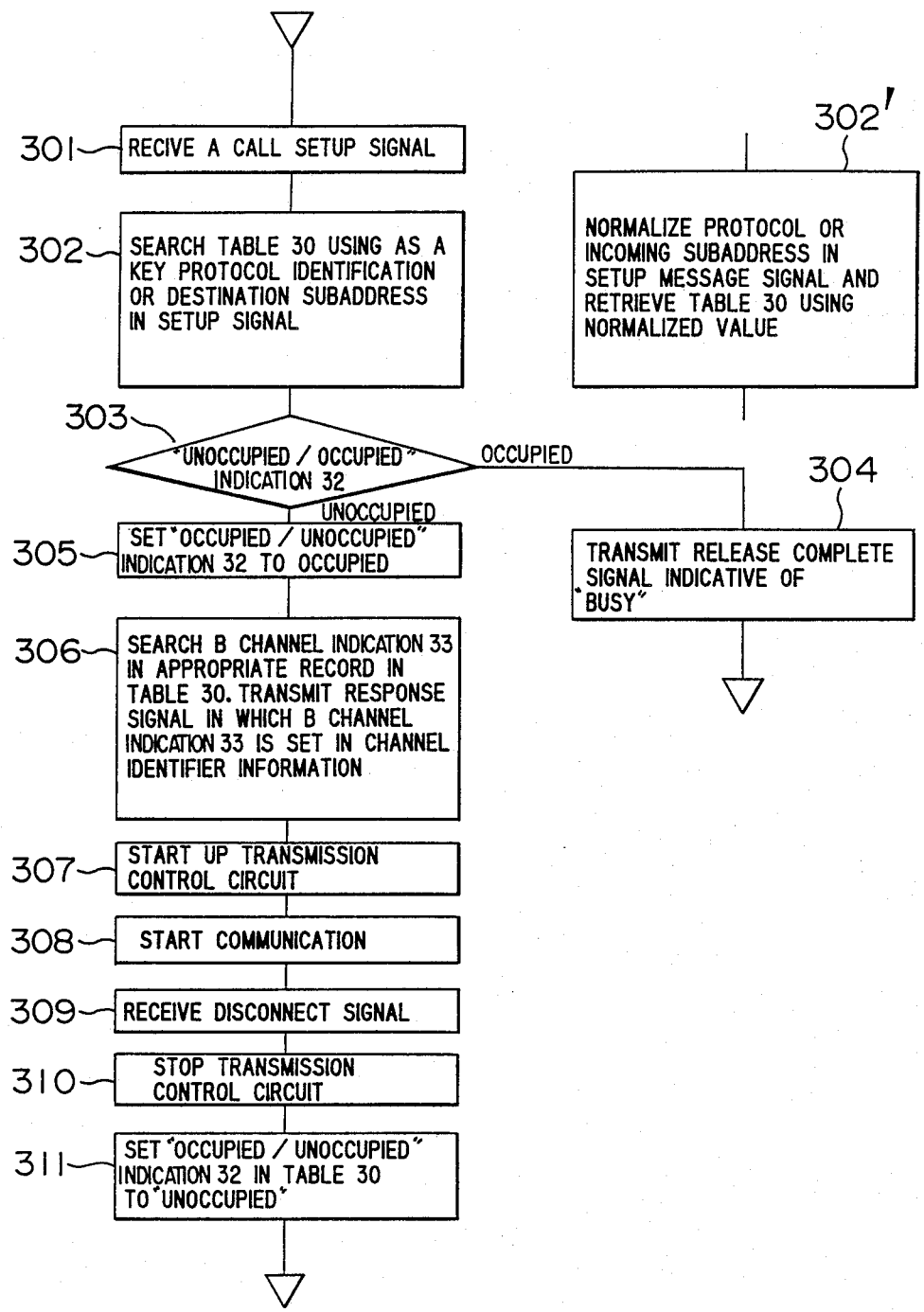
FIG. 4 is a flowchart of the operation of a processor of FIG. 2 performed when the table of FIG. 3 is used.

FIG. 4 is a flowchart indicative of the operation of the processor 16 of FIG. 2 performed when the table 30 is used where a protocol identification/ subaddress corresponds to a B channel in FIG. 3.

The operation of the first embodiment will now be described with reference to the flowchart of FIG. 4. At step 301, assume that the processor 16 receives a call setup signal defined by CCITT Recommendations in I-Series ISDN user network interface through the D channel from a terminal 5. At step 302, the processor 16 retrieves a protocol identification/ subaddress indication 31 in the table 30 using, as a key, protocol identification or destination subaddress information contained in the low layer compatibility information in the setup message signal. At step 303, the processor checks whether the occupied/unoccupied transmission control circuit indication 32 in the appropriate record indicates "unoccupied" or "occupied". If the indication 32 indicates "occupied", the processor transmits a release complete signal indicative of "busy" to the ISDN 4 at step 304 to thereby terminate the processing. At step 303, if the indication 32 indicates "unoccupied", the processor sets the unoccupied/occupied indication 32 to "occupied" at step 305 and withdraws the B channel indication 33 of the matching record in the table 30. At step 306, the processor sets the transmission using the B channel 12 indicated by the B channel indication 33 in the channel identifier information in a connect signal defined by CCITT Recommendations in the I-series ISDN user network interface and data transmits data to the ISDN 4. Simultaneously, at step 307, the processor starts up the appropriate transmission control circuit 15-i to perform data communication at step 308. At step 309, when a disconnect signal is received from the terminal 5, the processor stops the appropriate transmission control circuit 15-i at step 310. At step 311, the processor sets to "unoccupied" the occupied/unoccupied transmission control circuit indication 32 in the table 30.

Thus, the terminal 5 and central processing unit 2 can communicate with each other using the same transmission control procedure. Which of the protocol identification and destination subaddress in the call setup signal should be used to designate a transmission control procedure in the step message may be determined in the network system.

Figure 5:
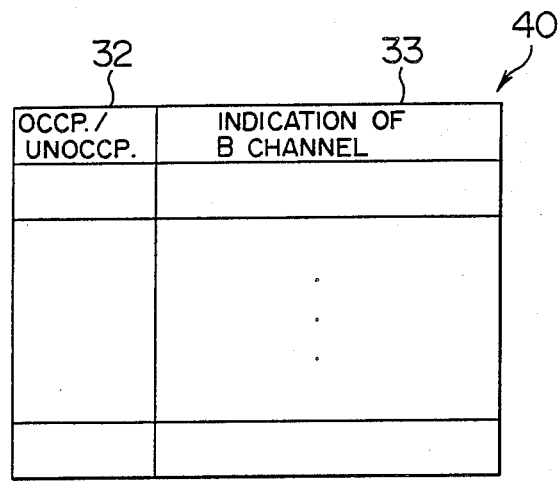
FIG. 5 shows the illustrative structure of a table where protocol discrimination/subaddress corresponds to B channel.

FIG. 5 illustrates another structure of a table 40 where a protocol identification/subaddress corresponds to a B channel. The table 40 includes unoccupied/occupied transmission control circuit indications 32 and B channel indications 33 and used when the protocol identification or subaddress is normalized. The operation of the processor 16 performed when the table 40 is used is similar to the operation flow of FIG. 4 except that the operator searches the appropriate record by looking up the table 40 using a normalized protocol identification or subaddress. In other words, in FIG. 4, a step 302' is executed in place of step 302.

Figure 6:
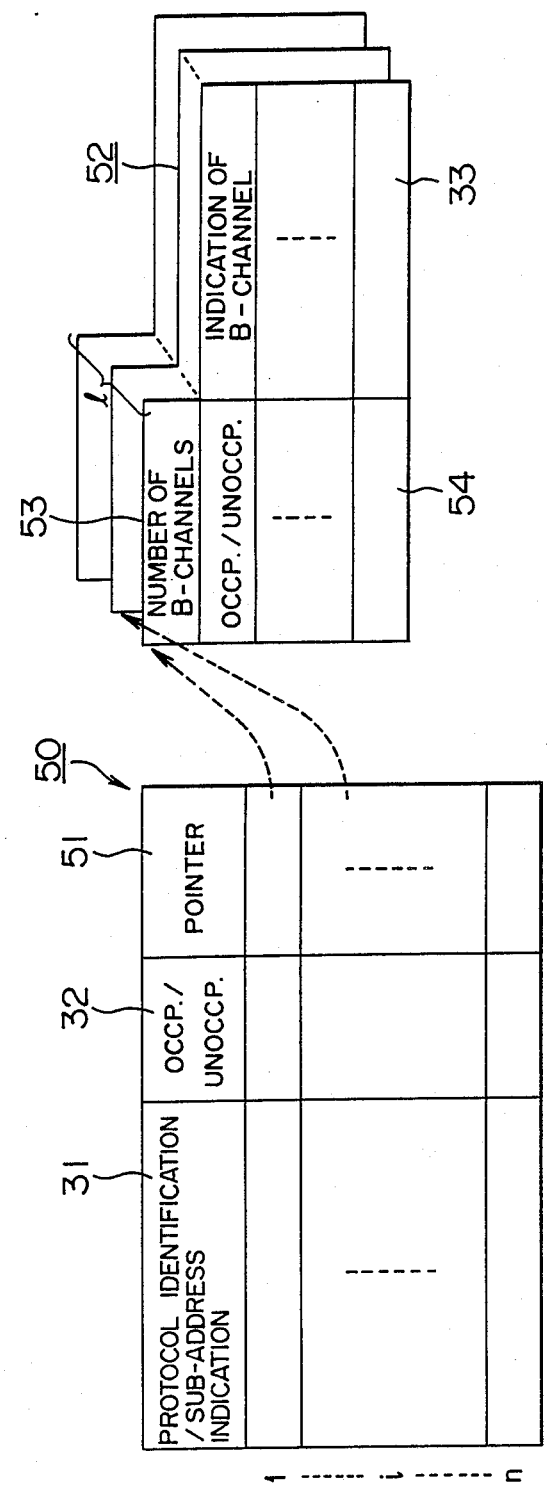
FIG. 6 shows the illustrative structure of a table in which protocol discrimination/subaddress corresponds to B channel used when the kinds of transmission control procedures are smaller in number than the number of B channels in the ISDN interface.

FIG. 6 illustrates the structure of a table in which a protocol identification/subaddress corresponds to a B channel and which is used when the number of kinds (()) of transmission control procedures is smaller than the number of B channels (n) in the ISDN interface. The table includes a protocol identification/ subaddress retrieve subtable 50 and a B channel management subtable 52. If the number of kinds of transmission control procedures is smaller than the number of B channels in the ISDN interface in the network system of FIG. 2, it is necessary to put a plurality of B channels 12 and the same kind of transmission control circuits 15-i in corresponding relationship. To this end, the protocol identification/subaddress retrieve subtable 50 of FIG. 6 includes a pointer 51 which points to a B channel management table 52 in place of the B channel indication 33 in the table 30 where a protocol identifications/subaddress corresponds to a B channel of FIG. 3. The B channel management table 52 manages a plurality of occupied-/unoccupied B channels 12 connected to the same kind of transmission control circuits 15-i and includes a number-of-B channels indication 53, occupied/unoccupied B channel indication 54 and B channel indication 33.

Figure 7:
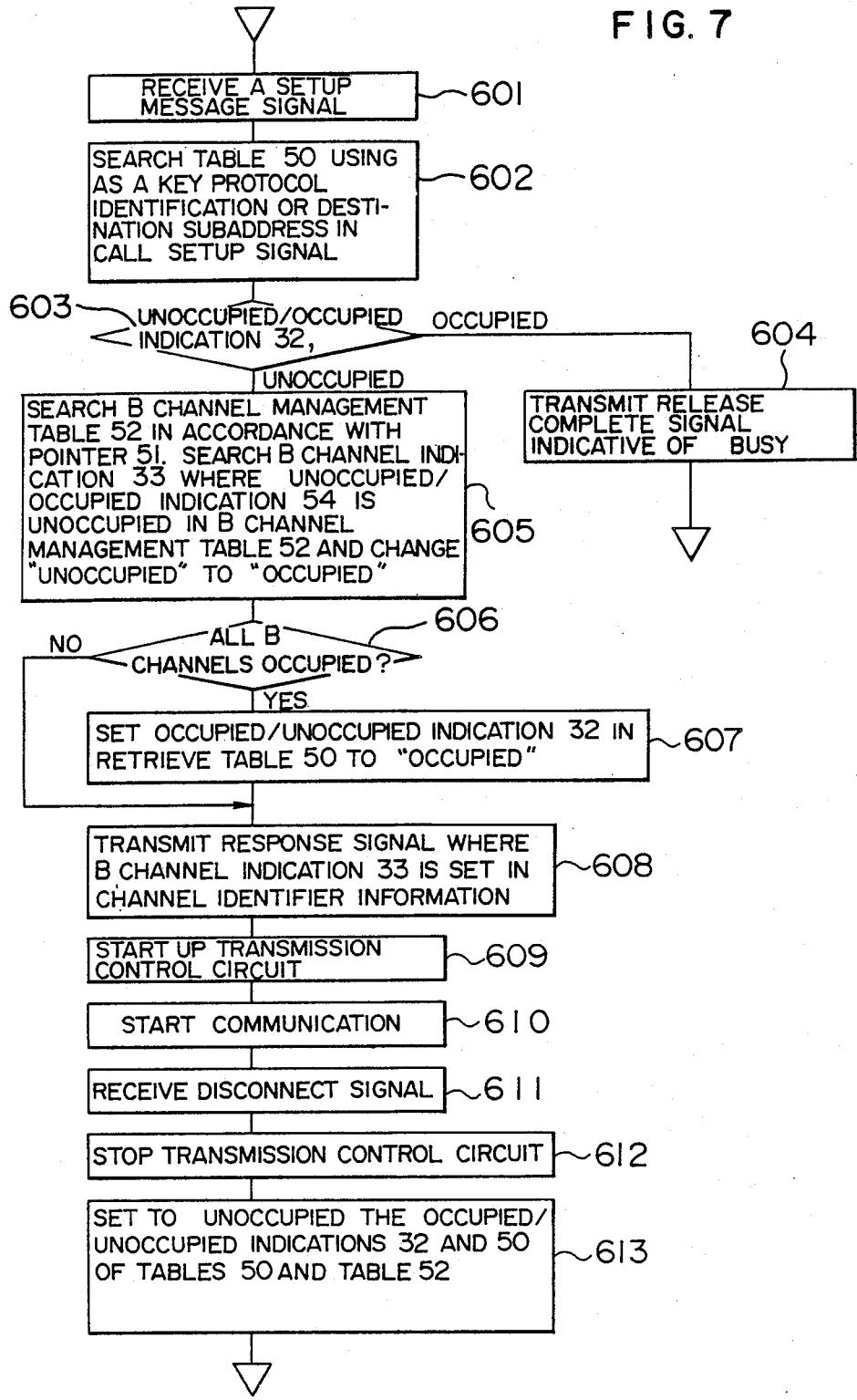
FIG. 7 is a flowchart of the operation of the processor of FIG. 2 performed when the table of FIG. 6 is used.

FIG. 7 illustrates the operation flow of the processor 16 produced when the table where a protocol identification/subaddress corresponds to a B channel is used. The operation of the communication network of FIG. 2 will now be described in accordance with the flow of FIG. 7. First, at step 601, the processor 16 receives a call setup signal defined by CCITT Recommendations in I-series ISDN user network interface through the D channel from a terminal 5. At step 602, the processor retrieves the protocol identification/ subaddress retrieve table 50 using, as a key, protocol identification or destination subaddress information contained in the low layer compatibility information of the call setup signal. At step 603, the processor checks the occupied/unoccupied indication 32 in the appropriate record to see if the indication shows "occupied" or not. If the record shows "occupied" at step 603, the processor sends to the ISDN 4 a release complete signal indicative of "busy" at step 604 and terminates processing thereof.

At step 603, if the record shows "unoccupied", the processor obtains the B channel management table 52 in accordance with the pointer 51 in the appropriate record, the processor searches a record, where the occupied/unoccupied B channel indication 54 indicates "unoccupied", sequentially from the head record in the B channel management table 52 (1→i→1), changes to "occupied" the occupied/unoccupied B channel indication 54 in that record and then selects step 608. When the processor determines at step 606 that all the B channels are occupied, it sets to "occupied" all the "occupied/ unoccupied" indication 32 in the retrieve table 50 at step 607. If the processor determines that there is still an unoccupied B channel at step 606, it selects step 608 where the processor withdraws data on the B channel indication 33 in a record indicated as being "occupied" in the occupied/unoccupied B channel indication 54 at step 605, sets communication using the B channel 12 shown by the B channel indication 33 in the channel identifier information in a response signal defined by CCITT Recommendations in I-series ISDN user network interface and then transmits data to the ISDN 4. Simultaneously, at step 609, the processor starts up an unoccupied transmission control circuit 15-i and, at step 610, performs data communication. At step 611, when the processor receives a disconnect signal from the terminal 5, it stops transmission control circuit at step 612. At step 613, the processor sets to "unoccupied" both the occupied/unoccupied indications 32 and 52 in the retrieval subtable 50 and B channel management subtable 5.

Figure 8:
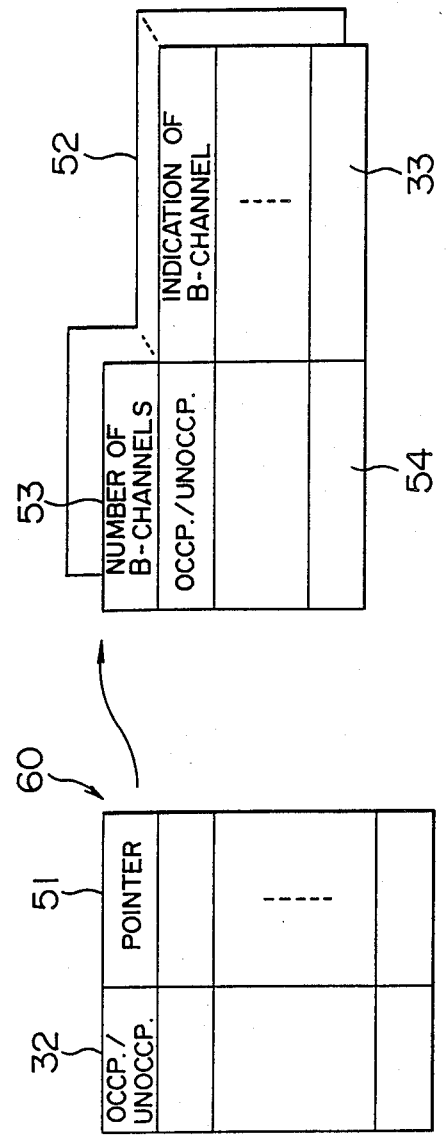
FIG. 8 shows the illustrative structure of a table in which protocol discrimination/subaddress corresponds to B channel.

FIG. 8 illustrates another structure of the table 60 in which a protocol identification/subaddress corresponds to a B channel. The table 60 includes occupied/unoccupied transmission control circuit indications 32 and B channel management table pointers 51, and used when the protocol identification or subaddress is normalized. The operation of the processor 16 performed when the table 60 is used is similar to the operation flow of FIG. 7 except that the processor searches an appropriate record by looking up the table 60 using the normalized protocol identification or subaddress.

II. Second Embodiment

Figure 9:
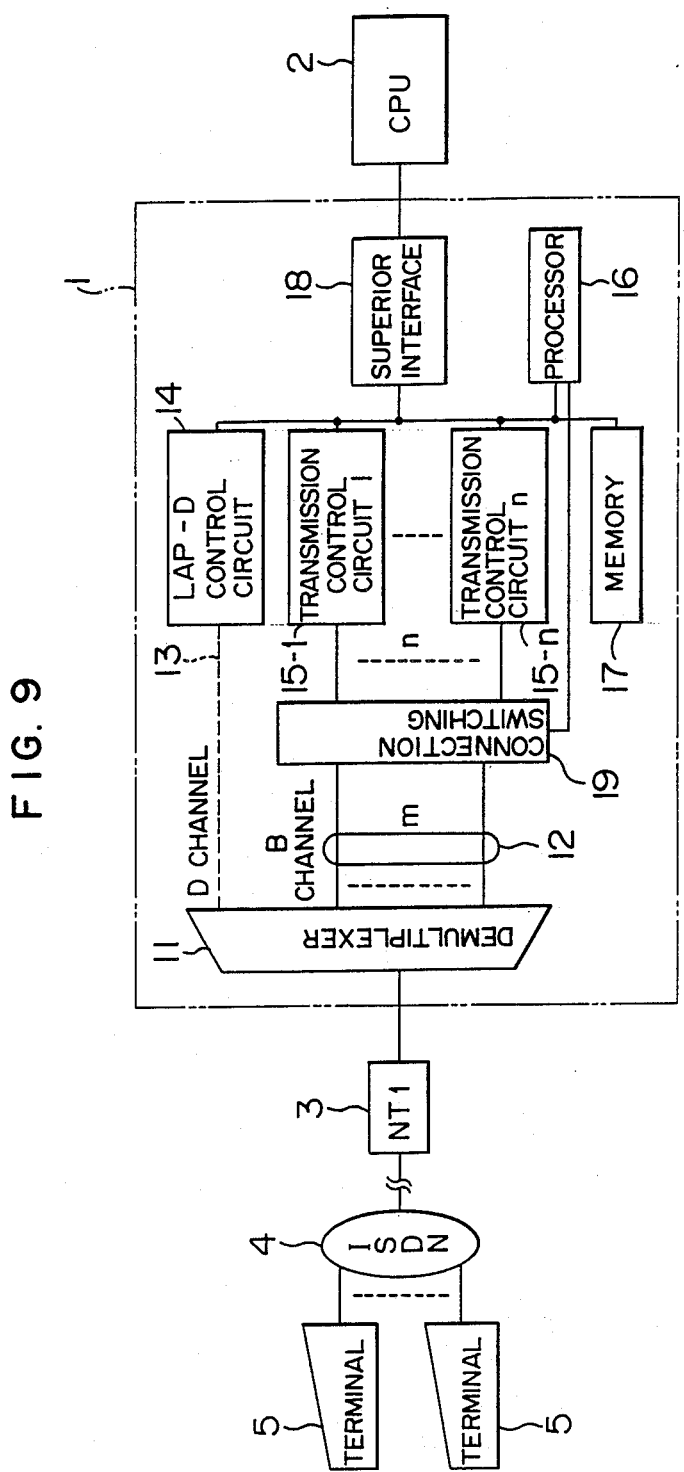
FIG. 9 is a schematic of a communication network used for describing a transmission control procedure selecting system indicative of a second embodiment of the present invention.

FIG. 9 is a schematic of a communication network used for describing a transmission control procedure selecting system indicative of a second embodiment of the present invention. In FIG. 9, a connection switching circuit 19 is used to switch the connection between a transmission control circuit 15-i and a B channel 12. The other remaining structure portions are similar to the corresponding ones of FIG. 2. In the second embodiment, communication is possible even if traffic occurs collectively which uses a specific transmission control procedure. The second embodiment is the same as the first embodiment except that the total number of transmission control circuits (n) for various transmission control procedures is larger than the number of B channels (m) in the ISDN interface and that the connection switching circuit 19 is provided which switches between the transmission control circuits and the B channels in the ISDN interface in accordance with request for communication.

Figure 10:
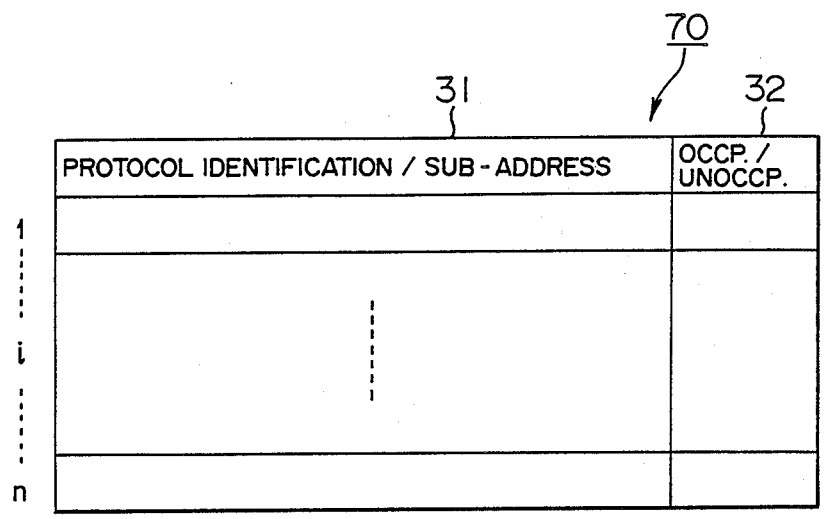
FIG. 10 shows the illustrative structure of a communication control circuit management table.

FIG. 10 illustrates the structure of the transmission control circuit management table 70 in the second embodiment. As in the first embodiment, the table of FIG. 10 and other tables described later are stored in the memory 17 of FIG. 9 in the second embodiment. The transmission control management table 70 includes protocol identification/subaddress indications 31 and occupied/unoccupied transmission control circuit indications 32. The management table 70 is applicable to either a process for selecting a transmission control circuit in accordance with protocol identification or a process for selecting a transmission control circuit in accordance with subaddress and is capable of managing the occupied/unoccupied states of the transmission control circuits corresponding to the protocol identification or subaddress.

Figure 11:
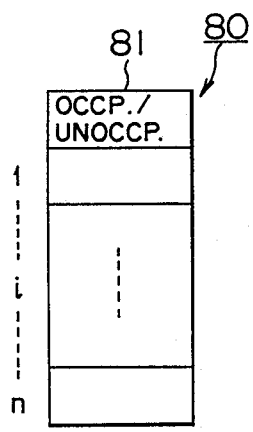
FIG. 11 illustrates the structure of a B channel management table.

FIG. 11 illustrates the structure of a B channel management table 80 in the second embodiment. The table 80 includes occupied/unoccupied B channel indications 81 and indicates the occupied/unoccupied state of a B channel corresponding to each of numbers given sequentially to the records, starting from the head record.

Figure 12:
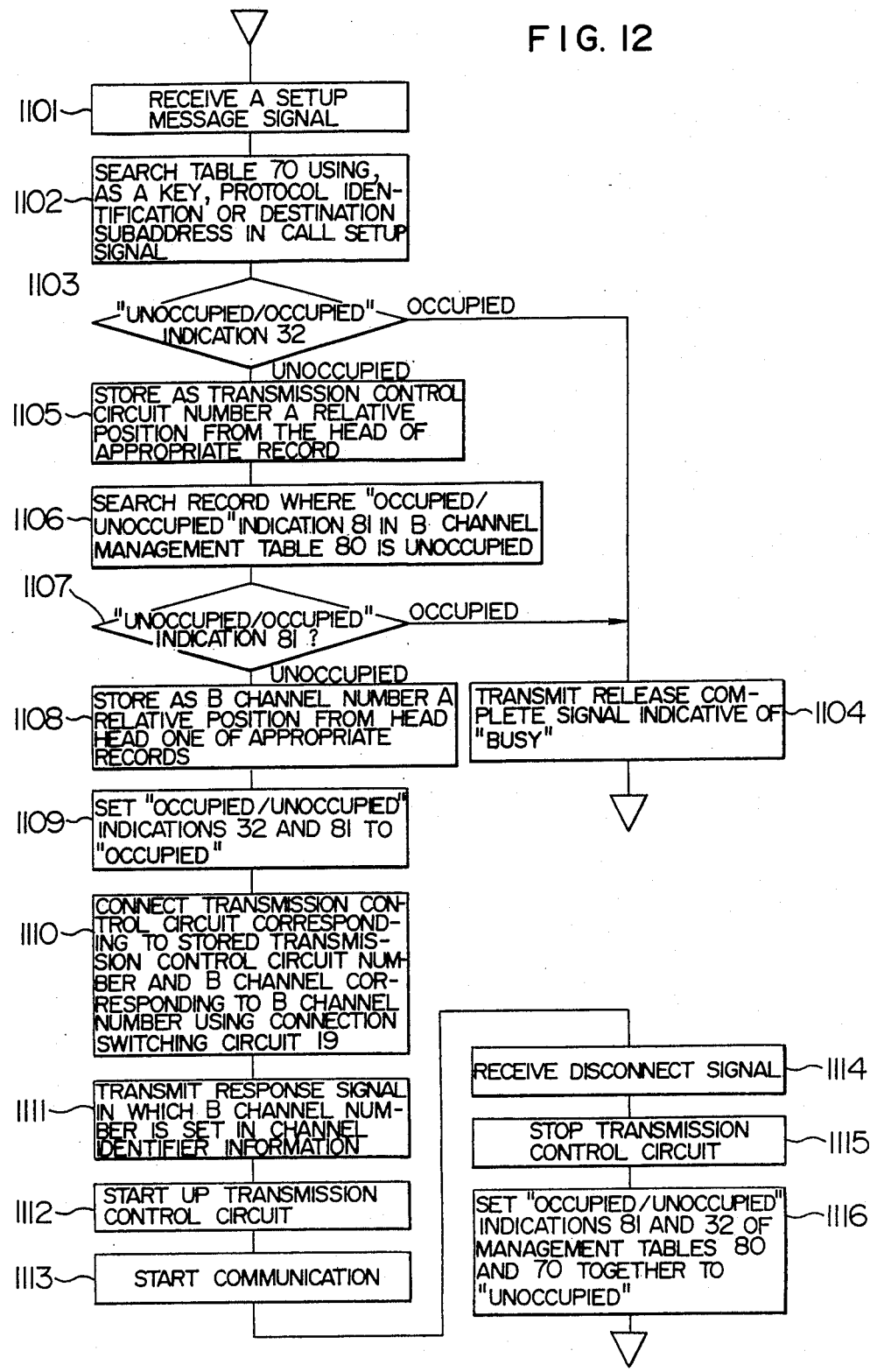
FIG. 12 is a flowchart of the operation of the processor of FIG. 9 performed when the tables of FIGS. 10 and 11 are used.

FIG. 12 illustrates the operation flow in the processor 16 shown in FIG. 9 occurring when the tables 70 and 80 of FIGS. 10 and 11 are used. The operation of the second embodiment will be described in accordance with the flow of FIG. 12. At step 1101, the processor 16 receives a call setup signal defined by CCITT Recommendations in I-series user network interface through the D channel from a terminal 5. At step 1102, the processor retrieves a protocol identification/subaddress indication 31 in each record in the management table 70 using as a key the protocol identification or destination subaddress information contained in the low layer compatibility information in the call setup signal to find a transmission control circuit having the same transmission control procedure as the terminal 5. At step 1103, it checks whether an occupied/unoccupied transmission control circuit indication 32 indicative of a desired transmission control circuit shows "occupied" or "unoccupied". If the indication 32 shows "unoccupied", the processor sends a release complete signal indicative of "busy" to the ISDN 4 at step 1104 and terminates the processing. If the indication 32 indicates "unoccupied" at step 1103, the processor stores in the memory 17 the numbers of the records, which were indicated as being "unoccupied" at step 1105, starting from the head record, as the transmission control circuit numbers. At step 1106, the processor searches an unoccupied B channel in accordance with the B channel management table 80 of FIG. 11. The respective records in the B channel management table 80 are an occupied/unoccupied B channel indication 81. The indication 81 indicates the occupied/ unoccupied states of the B channels corresponding to the record numbers, starting from the head record number. At step 1107, if the indication 81 indicates "occupied", the processor executes the process at step 1104 and terminates the processing thereof.

If the indication 81 indicates "unoccupied", the processor stores as B channel numbers in the memory 17 the relative position from the head of the appropriate record at step 1108. Subsequently, at step 1109, the processor sets to "occupied" the "occupied/unoccupied" indications 32 and 81 in the management tables 70 and 80.

If an unoccupied transmission control circuit and an unoccupied B channel are obtained in the above procedures, the processor 16 commands the connection switching circuit 19 to connect the unoccupied transmission control circuit and the unoccupied B channel at step 1110. At step 1111, the processor sets transmission using the B channel 12 in the channel identifier information in a response signal defined by CCITT Recommendations in I-series user network interface and transmits data to the ISDN 4. Simultaneously, at step 1112, the processor starts up the appropriate transmission control circuit 15-i. At step 1113, the processor performs data transmission. At step 1114, if the processor receives a disconnect signal from the terminal 5, it stops the transmission control circuit 15-i at step 1115. At step 1116, the processor sets to "unoccupied" the "occupied/unoccupied" indications 81 and 32 of the B channel management table 80 and transmission control circuit management table 70 together.

Which of the protocol discrimination and the destination subaddress should be used as the transmission control procedure designating process in the call setup signal may be determined in the network system.

Figure 13:
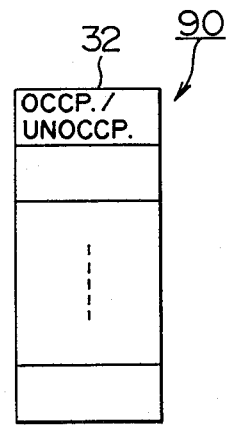
FIG. 13 illustrates the structure of a transmission control circuit management table.

FIG. 13 illustrates another structure of the transmission control circuit management table 90 in the second embodiment. The table 90 includes occupied/ unoccupied transmission control circuit indications 32 which are used when the protocol identification or subaddress is normalized. The operation of the processor 16 performed when the transmission control circuit management table 90 is used is the same as the operation flow of FIG. 12 except that the processor determines the occupied/unoccupied state of the transmission control circuit corresponding to the appropriate record by looking up the management table 90 using a normalized protocol identification or subaddress.

FIG. 14 illustrates the structure of the transmission control circuit management table used when the kinds of transmission control procedures are smaller in number than the B channels in the ISDN interface of FIG. 9. If the kinds of transmission control procedures are smaller in number than the B channels in the ISDN interface, a plurality of transmission control circuit 15-i of the same kind is provided and it is necessary to find an unoccupied transmission control circuit 15-i among them. To this end, the transmission control circuit management table 100 of FIG. 14 includes an unoccupied transmission control circuit presence/ absence indication 101 indicative of the presence/absence of an unoccupied transmission control circuit, a number-of-transmission control circuits indication 102 indicative of the number of transmission control circuits of the same group, and an occupied/unoccupied transmission control circuit indication field 103 indicative of whether each transmission control circuit is occupied or unoccupied, for a transmission control circuit group corresponding to the kind of transmission control procedures identified by each protocol identification/ subaddress indication area 31.

Figure 15:
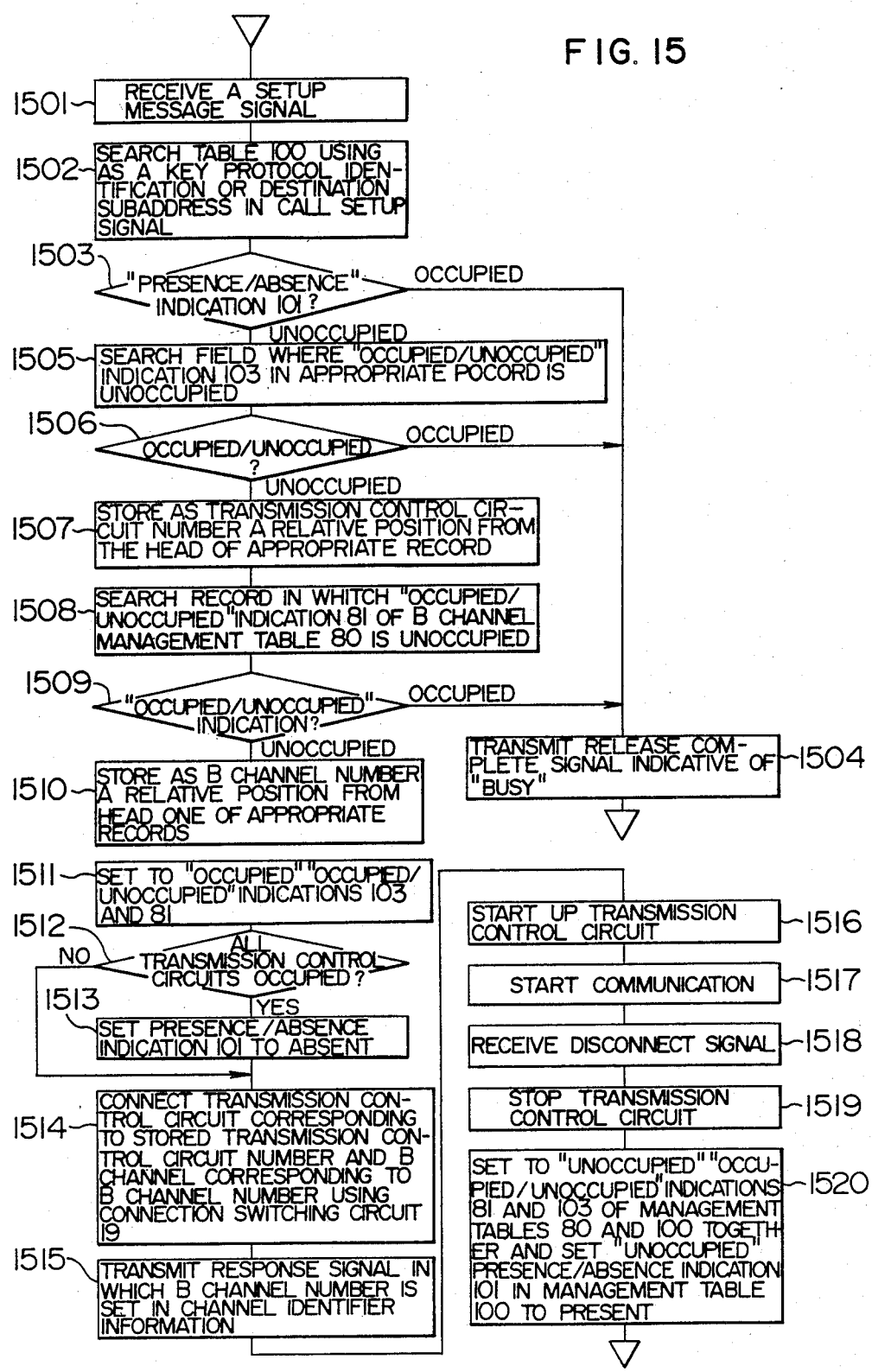
FIG. 15 is a flowchart of the operation of the processor of FIG. 9 performed when the tables of FIGS. 14 and 11 are used.

FIG. 15 illustrates the operation flow in the processor 16 of FIG. 9 occurring when the tables of FIGS. 14 and 11 are used. The operation of the communication network of FIG. 9 will be described below in accordance with the flow of FIG. 15. First, assume that the processor 16 receives a call setup signal defined by CCITT Recommendations in I-series user network interface via the D channel from a terminal 5 at step 1501. At step 1502, the processor retrieves the protocol identification/subaddress indication 31 in the management table 100 using, as a key, protocol identification or destination subaddress information contained in the low layer compatibility information in the call setup signal to find a record on a desired transmission control procedure. At step 1503, the processor checks the unoccupied transmission control circuit presence/absence indication 101 in the record found at step 1502. If the indication 101 indicates absence, the processor transmits to the ISDN 4 a release complete signal indicative of "busy" at step 1504 and terminates the processing.

At step 1503, if the processor recognizes that there is an unoccupied transmission control circuit as the result of referring to the unoccupied transmission control circuit presence/absence indication 101 at step 1503, it refers sequentially to the occupied/unoccupied transmission control circuit indications 103 in the records by the number of times indicated by the number-of-transmission control circuits indication 102 at steps 1505 and 1506 to obtain an unoccupied transmission control circuit. At step 1507, the processor stores in the memory 17 the relative address from the head one of the appropriate fields of the obtained unoccupied transmission control circuit as the transmission control circuit number. At step 1508, the processor searches an unoccupied B channel using the B channel management table 80 shown in FIG. 11. At steps 1509 and 1510, the processor stores in the memory 17 as the B channel number the relative address from the head one of the records which indicate the obtained B channel. Subsequently, at step 1511, the processor sets both the "occupied/unoccupied" indications 103 and 81 of the management tables 100 and 80 to "occupied". At step 1512, the processor checks whether the transmission control circuit is occupied or not. If all the transmission control circuits are occupied, the processor sets the presence/absence indication 101 to "absent" at step 1513 and then selects step 1514. If there is an unoccupied transmission control circuit, the processor jumps the processing at step 1513 to selects step 1514 at which the processor uses the connection switching circuit 19 to connect an unoccupied transmission control circuit 15-i corresponding to the stored transmission control circuit number with an unoccupied B channel 12 for the corresponding B channel number. At step 1515, the processor sets the communication using the connected unoccupied B channel 12 in the channel identifier information in a response signal defined by CCITT Recommendations in I-series user network interface and sends data to the ISDN 4. Simultaneously, at step 1516, the processor starts up the appropriate transmission control circuit 15-i to perform data transmission at step 1517. At step 1518, when a disconnect signal is received from a terminal 5, the processor stops the transmission control circuit 15-i at step 1519. At step 1520, the processor sets both the occupied/unoccupied indication 81 and 103 of the B channel management table 80 and transmission control circuit management table 100 to "unoccupied" and sets the unoccupied transmission control circuit presence/absence indication 101 of the management table 100 to "present".

Figure 16:
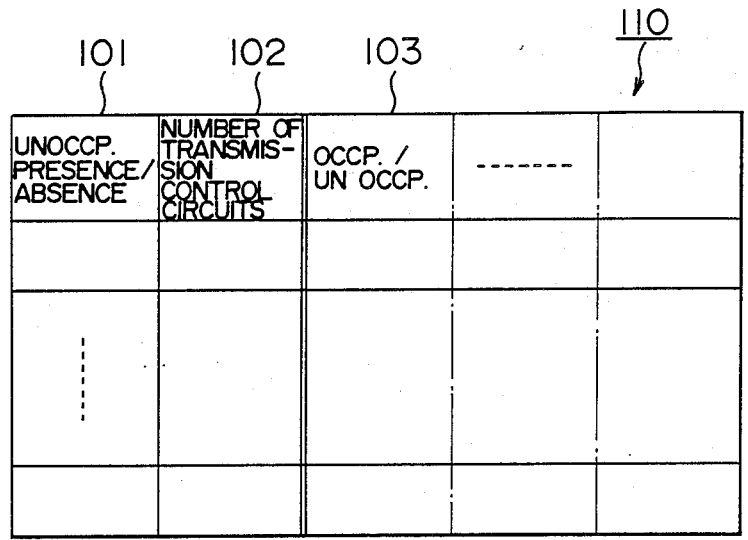
FIG. 16 illustrates the structure of the transmission control circuit management table.

FIG. 16 illustrates a modification of the transmission control circuit management table 110 of FIG. 14. The table 110 differs from the transmission control circuit management table 100 of FIG. 14 in that the former has no element such as the protocol identification/subaddress indication 31 and that is used when the protocol identification or subaddress is normalized. The operation of the processor 16 of FIG. 9 using the transmission control circuit management table 110 is similar to the operation flow of FIG. 15 except that the processor looks up the transmission control circuit management table 110, using the normalized protocol identification or subaddress to obtain the appropriate record.

While in the above embodiments the communication between a terminal and the computer has been illustrated, the particular embodiments may be applicable to the communication between computers or between terminals. While the examples in which B channels are used as the communication channels have been illustrated, the particular embodiments are applicable similarly to systems in which a high speed channel such as $H_0$, $H_1$ is used.

What is claimed is:

1. A transmission procedure selecting process in a data communication network system which includes a plurality of terminals, an ISDN switching network which exchanges a plurality of circuit lines with the plurality of terminals, a communication control device connected with the ISDN switching network via a multiplexed signal interface for providing circuit control for signals transmitted through the interface, the communication control device including a plurality of transmission control circuits, each being connected to a data channel, a central processing unit connected to the communication control device, comprising:

a step that prior to transmission of data from a terminal to the central processing unit, said terminal transmits a call setup signal which designates the transmission control procedure adaptive to said terminal via a control channel of the multiplexed interface;

a step that the central processing unit selects transmission control circuit designated by the transmission control procedure in said call setup signal received via the control channel; and a step that the central processing unit transmits to the ISDN switching network via the control channel of the multiplexed interface a request for connection of the terminal and the data channel connected to the selected transmission control circuit.

2. A transmission procedure selecting process according to claim 1, wherein the information which designates the transmission control procedure is included in terminal communication attribute information in a call setup signal transmitted by the terminal.

3. A transmission procedure selecting process according to claim 1, wherein the information which designates the transmission control procedure is included in destination subaddress data included in a call setup signal.

4. A transmission procedure selecting process according to claim 2, wherein if the kinds of transmission control procedures are set so as to be smaller in number than data channels in the interface, same kind of transmission control circuits are connected to a plurality of data channels, and wherein the central processing unit selects an unoccupied one of the plurality of data channels connected to the transmission control circuits designated by the information which designates the transmission control procedure.

5. A transmission procedure selecting process according to claim 3, wherein if the kinds of transmission control procedures are set so as to be smaller in number than data channels in the interface, same kind of transmission control circuits are connected to a plurality of data channels, and wherein the central processing unit selects an unoccupied one of the plurality of data channels connected to the transmission control circuits designated by the information which designates the transmission control procedure.

6. A transmission procedure selecting process according to claim 1, wherein the transmission control circuits are larger in number than the data channels, and further including means for switching the connection between the plurality of data channels and the plurality of transmission control circuits in the data communication network system, and wherein the step at which the central processing unit selects the transmission control circuit includes selecting an unoccupied one of the transmission control circuits designated by the information which designates the transmission control procedure, selecting an unoccupied one of the plurality of data channels, and making a request to the switching means for connection of the selected unoccupied transmission control circuit and the unoccupied data channel.

7. A transmission procedure selecting process according to claim 6, wherein the data which designates the transmission control procedure is included in terminal communication attribute information in a call setup signal transmitted by the terminal.

8. A transmission procedure selecting process according to claim 6, wherein the information which designates the transmission control procedure is included in destination subaddress information in a call setup signal transmitted by the terminal.

* * * * *

UNITED STATES PATENT AND TRADEMARK OFFICE
CERTIFICATE OF CORRECTION

PATENT NO.   :   4,985,887
DATED        :   Jan. 15, 1991
INVENTOR(S)  :   MIZUHARA, et al

It is certified that error appears in the above-identified patent and that said Letters Patent is hereby corrected as shown below:

ON THE TITLE PAGE

Please correct the [73] Assignee as follows:
    delete "Thomson Composants Microondes,
        Puteaux, France" and
    insert --HITACHI, LTD.--
        Tokyo, Japan Signed and Sealed this Eleventh Day of August, 1992

*Attest:*

DOUGLAS B. COMER

*Attesting Officer*       *Acting Commissioner of Patents and Trademarks*